April 27, 1943.   H. S. HOWE   2,317,912
PNEUMATIC TIRE
Filed March 12, 1941

INVENTOR
Harold S. Howe
BY
ATTORNEY

Patented Apr. 27, 1943

2,317,912

UNITED STATES PATENT OFFICE 2,317,912

PNEUMATIC TIRE

Harold S. Howe, Detroit, Mich., assignor to United States Rubber Company, New York, N. Y., a corporation of New Jersey Application March 12, 1941, Serial No. 382,915

10 Claims. (Cl. 152—356)

This invention relates to pneumatic tires and, in particular, it relates to the carcass of pneumatic tires and to the selection of the plies which form the carcass. More particularly, the invention relates to the distribution in a pneumatic tire carcass of certain plies having higher tensile strength and/or elongation characteristics for the purpose of increasing the rupture resistance of the tire. By reference to "rupture" of pneumatic tires it is intended herein to mean a break or separation of the cords forming the plies of a tire carcass caused when the tire rolls over a sharp or pointed object which results in an excessive and localized deformation of the tire carcass. In the manufacture of pneumatic tires, a considerable amount of development and progress has been made in their overall performance. However, very little attention has been directed toward specific improvements in rupture resistance.

I have found that when a sharp object is forced against a tire tread, a temporary indentation is formed in the carcass and greater strains take place on the inner plies as distinguished from the outer plies. This is due in part to the fact that such plies are more remote from the point indentation and therefore they tend to increase in area. By increasing the strength and/or elongation of the second or third ply in a 4 or 6-ply tire, I find that all of the carcass plies will function more uniformly collectively to resist ruptures. By reference to specific plies, it is to be understood that the first or band ply is the inner ply of the tire carcass or the ply that lies adjacent the inner tube, while the remaining plies are numbered consecutively from the inner to the outer plies. It is also to be understood that reference to plies is intended to include the carcass plies, excluding other reinforcing fabrics such as breaker strips or plies.

As before stated, the inner plies of the carcass are subjected to greater abuse when a sharp object is forced against the tire tread than the outer plies. The first or band ply is an exception to this rule because the cords in the first ply are not locked between adjacent plies in which the cords extend in substantially opposite directions. Accordingly, when the first ply is subjected to unusual distortions, the cords of the ply are freer to adjust themselves and to thereby release excessive stresses. Therefore, in order to increase the rupture resistance of a tire carcass, in a 4 or 6-ply tire, improvements may be obtained by special treatment of the second ply or by special treatment of the second and third plies.

There are various ways in which the second or third ply may be modified in order to obtain an improvement in the rupture resistance of the entire carcass. For example, an increase in the tensile strength of the second ply will effect an improvement. An improvement may also be obtained by increasing the elongation characteristics of the cords which form the second ply. A still further improvement may be had by increasing the tensile strength in combination with an increase in the elongation characteristics of the cords of the second ply. By any such a modification of the plies of the carcass, a substantial increase in rupture resistance will be obtained. Such an increase is the result of the use of additional material or is due to an improvement in the quality of the material used in the formation of the second ply of the tire. The resulting improvement, by increasing the quality of the second ply, is comparatively greater than if all of the plies were treated in the same manner as the second ply.

I have also found that substantial improvements in the rupture resistance of pneumatic tires may be obtained by improving the characteristics of the second ply in a 4 ply tire and reducing the quality of the remaining plies. By this arrangement it is possible to obtain a substantial improvement in rupture resistance of the tire without adding to the total strength of the tire carcass. In other words, the improvement can be obtained without any additional material or any increase in total cost of the tire.

Among the objects of my invention are to increase the rupture resistance of a tire carcass without increasing the total strength or elongation characteristics of the plies of the carcass; to provide a substantial increase in rupture resistance by changing only one or two plies of the tire carcass; and to provide an increase in rupture resistance without increasing tire cost. These and other objects and advantages will appear more fully in the following detailed description when considered in connection with the accompanying drawing, in which.

Figure 1:
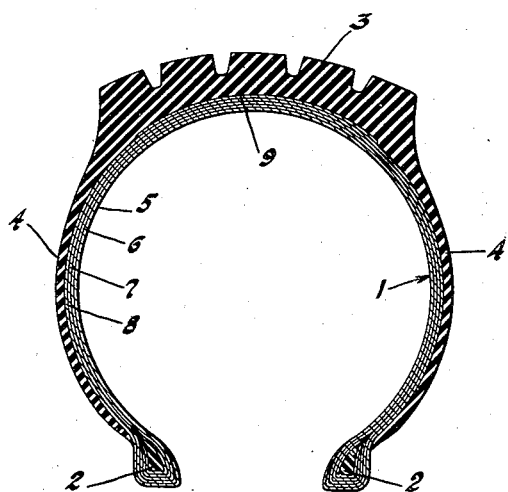
Fig. 1 is a transverse view, in section, of a pneumatic tire embodying my invention.

With reference to the drawing and, in particular, to Fig. 1, I show a 4-ply pneumatic tire comprising a carcass 1, inextensible beads 2, a tread 3 of rubber composition, and sidewall portions 4 of a rubber composition. The carcass 1 is formed of fabric plies 5, 6, 7, and 8 corresponding to plies conventionally referred to as the first, second, third, and fourth plies, respectively. The first ply 5 is sometimes referred to as the band ply or the inner ply. A breaker strip 9 completes the carcass 1.

Figure 2:
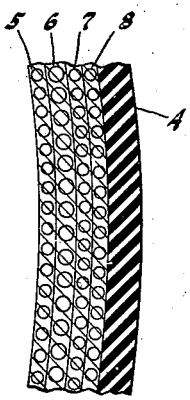
Fig. 2 is an enlarged view, in section, of a portion of the sidewall of the pneumatic tire illustrated in Fig. 1.

An enlarged view of a portion of the tire carcass and sidewall is shown in Fig. 2. According to this illustration, the second ply 6 is shown to be formed of heavier cords than the remaining plies 5, 7, and 8. The strength of the second ply 6 may be obtained in various ways. For example, the strength of the individual cords may be increased; the cords may be spaced closer together; or the cords may be formed of a better quality material to provide the additional strength. The principal qualification of the second ply is that its tensile strength per inch of cross section shall be greater than the tensile strength of any of the remaining plies 5, 7, or 8. It is also to be understood that the second ply may be formed of a material which is different in composition than the remaining plies. For example, a higher strength ply formed of rayon cords could be utilized in combination with the remaining plies formed of cotton cords.

An example of the results obtained from my invention is indicated in the following tables:

Table I

| Ply | Conventional tire inch ply strength | Cord stretch @ break | Cord stretch @ 10 lbs. |
| --- | --- | --- | --- |
| | Pounds | Per cent | Per cent |
| First | 440 | 11.25 | 8.00 |
| Second | 440 | 11.25 | 8.00 |
| Third | 440 | 11.25 | 8.00 |
| Fourth | 440 | 11.25 | 8.00 |
| Total strength per inch crosswise of cords | 1,760 | Strength rating____ 100<br>Rupture rating____ 100 | Per cent |

Table II

| Ply | New construction of tire inch ply strength | Cord stretch @ break | Cord stretch @ 10 lbs. |
| --- | --- | --- | --- |
| | Pounds | Per cent | Per cent |
| First | 395 | 8.5 | 8.00 |
| Second | 460 | 11.5 | 8.00 |
| Third | 395 | 8.5 | 8.00 |
| Fourth | 395 | 8.5 | 8.00 |
| Total strength per inch crosswise of cords | 1,645 | Strength rating____ 94<br>Rupture rating____ 108 | Per cent |

Table III

| Ply | Another new construction of tire inch ply strength | Cord stretch @ break | Cord stretch @ 10 lbs. |
| --- | --- | --- | --- |
| | Pounds | Per cent | Per cent |
| First | 440 | 11.25 | 8.00 |
| Second | 525 | 12.50 | 8.00 |
| Third | 440 | 11.25 | 8.00 |
| Fourth | 440 | 11.25 | 8.00 |
| Total strength per inch crosswise of cords | 1,845 | Strength rating____ 105<br>Rupture rating____ 115 | Per cent |

Table I illustrates characteristics of a conventional 4-ply tire, in which all of the plies of the carcass are uniform in ply strength, stretch at break, and stretch at 10 pounds load. For comparative purposes, the total strength rating of the carcass of this tire is given as 100% and the rupture rating as demonstrated by actual tests is given as 100%. All of the tests as shown by the tables were conducted with pneumatic tires incorporating cotton cords. The cords as shown in this table are of 9.3/3/2 construction having a gauge of .031 inch.

In Table II it is noted that the first, third, and fourth plies are similar in ply strength, but the second ply has a greater ply strength and a greater stretch at break. From this table it is noted that the total strength of the carcass is equal to 1645 pounds per inch. The first, third and fourth plies are formed of cords of 12/3/2 construction having a gauge of .0275 inch, while the second ply cords have a 12/4/2 construction and a gauge of .032 inch. Based on Table I, the construction as shown in Table II provides a carcass strength rating of 94%, while the rupture rating, as demonstrated by actual tests, shows a rating of 108%. It is, therefore, apparent that even though the total carcass strength is reduced, an improvement can be obtained in rupture resistance.

Table III illustrates a further demonstration of the invention, in which the first, third, and fourth plies of the tire carcass are the same as the plies illustrated in the example in Table I and the second ply is formed of cords of 17.5/4/3 construction being a gauge of .031 inch. In the present case the strength of the second ply is increased to 525 pounds and the stretch of the cords at break is increased to 12.50%. As a result of this construction the strength of the total carcass is increased in proportion to the strength added in the second ply to show a strength rating of 105%. This brings the rupture rating to 115%. The table, therefore, shows that the increase in rupture rating is greater in proportion to the total strength increase of the carcass.

Figure 3:
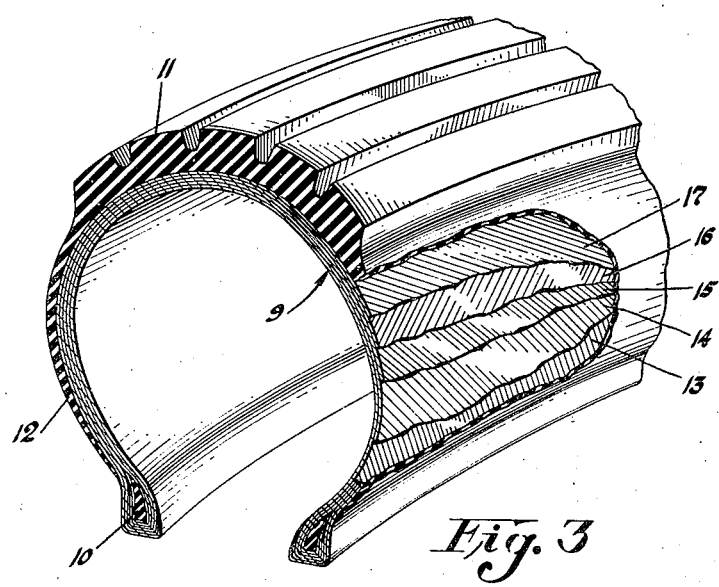
Fig. 3 is a perspective view, partly in section, of a portion of a pneumatic tire illustrating a modification of the invention.

Referring to Fig. 3, I show a modification of my invention in the form of a pneumatic tire comprising a carcass 9, inextensible beads 10, and a tread 11 and sidewall portions 12 of rubber composition. The carcass 9 is formed of plies 13, 14, 15, 16, and 17 representing the first, second, third, fourth and fifth plies, respectively. In this construction the second ply 14 and third ply 15 are formed of cords which run substantially in the same direction. Because of this condition, there is no locking effect between the second and third plies caused by adjacent cords running substantially at right angles thereto. The second and third plies, therefore, function as a single ply and while five plies are illustrated, the tire, for all practical purposes, may be considered as a 4-ply tire, on the assumption that the second and third plies function as a single ply, which may be considered as a composite ply. The use of a double ply such as the combined plies 14 and 15 provide another means for obtaining, in effect, a stronger second ply. In this case the plies 14 and 15 are formed so that their inch tensile strength collectively is greater than that of either of the remaining plies 13, 16, or 17.

Figure 4:
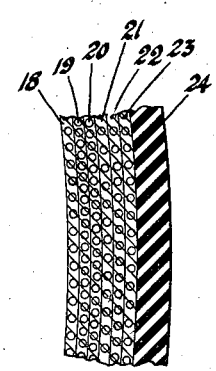
Fig. 4 is a transverse view, in section, of the sidewall portion of a pneumatic tire illustrating a further modification of my invention, as applicable to a 6-ply tire.

A still further modification is shown in Fig. 4 which illustrates, in section, a portion of a 6-ply tire and which consists of a carcass formed of plies 18, 19, 20, 21, 22, and 23 representing respectively the first to sixth plies, inclusive, and a sidewall portion 24 of rubber composition. Each of the plies in this construction is formed of rubberized cords and the cords in each ply extend in substantially opposite directions with respect to the cords in the adjacent ply or plies. The second and third plies, as represented by the reference characters 19 and 20, contain either a greater number of cords per inch or are formed of stronger cords than the cords in either of the remaining plies 18, 21, 22, or 23. As in the case illustrated in Fig. 2, the second ply in Fig. 4 may be used singularly as the strongest ply in the carcass. It is to be understood that in a 6-ply tire, it is more desirable for the second and third plies each to be formed of stronger materials than the remaining plies. Tests have indicated that both the modifications as shown in Figs. 3 and 4 will function in the same manner as the principal embodiment of the invention illustrated in Figs. 1 and 2 to show a substantial improvement in rupture resistance.

Figure 5:
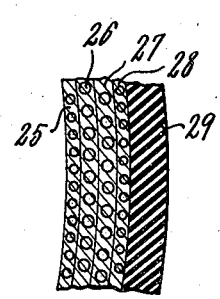
Fig. 5 is an enlarged view, in section, of a portion of the sidewall of a 4-ply pneumatic tire illustrating increased strength of the 2nd and 3rd plies.

While reference has been made to special treatment of the second ply of a 4-ply tire, it is to be understood that the third ply may be likewise treated, or the improvement may be distributed between the second and third plies. Fig. 5 shows a sidewall portion of a pneumatic tire which includes plies 25, 26, 27 and 28 representing plies one to four, respectively. A layer of rubber composition 29 covers the outer ply 28. In this construction the plies two and three are each stronger than either the first or fourth ply. The cords forming the plies of this modified form may b- substantially the equivalent of the cords forming the tire as described with reference to Fig. 2. That is, the total strength of the carcass may remain the same while the increase in strength of the second and third plies is offset by a decrease in strength in the first and fourth plies. In either case the principle of strengthening this region of the carcass is the same.

While cotton cords have been mentioned as the material forming the strain resisting elements of the various plies, it is to be understood that the plies may be formed of various other materials such as rayon, synthetic silks, synthetic linear polyamides or metallic wires, and that the constructions may be in the form of yarns, plied yarns, or cords.

As thus shown and described, it is believed apparent that I have provided a novel arrangement of tire elements in which improvements in rupture resistance may be obtained without any increase in the total amount of materials used or in the total strength of the resulting carcass, and while I have illustrated and described preferred embodiments of the invention, it is to be understood that it is susceptible of those modifications which appear within the spirit of the invention and the scope of the appended claims.

Having thus shown and described my invention, what I claim and desire to protect by Letters Patent is:

1. A pneumatic tire comprising tread and sidewall portions of rubber composition and a carcass composed of a plurality of plies of strain resisting elements, certain of the plies near the interior of the tire being separated by a ply construction, having a higher cross sectional tensile strength per inch than any of the remaining plies in the carcass.

2. A pneumatic tire comprising tread and sidewall portions of rubber composition and a carcass composed of a plurality of plies of strain resisting elements, one of the intermediate plies having a greater number of strain resisting elements and having greater tensile strength per inch of cross section than either the inner or outer ply.

3. A pneumatic tire comprising tread and sidewall portions of rubber composition and a carcass composed of a plurality of plies of strain resisting elements, one of the intermediate plies having a higher stretch capacity at break than either the inner or outer ply.

4. A pneumatic tire comprising tread and sidewall portions of rubber composition and a carcass composed of a plurality of plies of strain resisting elements, one of the intermediate plies having a higher tensile strength and a higher stretch capacity at break than either the inner or outer ply.

5. A pneumatic tire comprising tread and sidewall portions of rubber composition and a carcass composed of at least four plies of strain resisting elements, the ply lying adjacent the inner or first ply having a higher tensile strength than any of the other plies forming the carcass.

6. A pneumatic tire comprising tread and sidewall portions of rubber composition and a carcass composed of at least four plies of strain resisting elements, the ply lying adjacent the inner or first ply having a greater number of ends per inch and a higher tensile strength per inch of cross section than the number of ends and tensile strength per inch in any of the remaining plies.

7. A pneumatic tire comprising tread and sidewall portions of rubber composition and a carcass composed of at least six plies of strain resisting elements, the second and third plies each having a higher stretch capacity at break than any of the remaining plies.

8. A pneumatic tire comprising tread and sidewall portions of rubber composition and a carcass composed of at least six plies of strain resisting elements, the second and third plies each having a higher tensile strength and higher stretch capacity at break than any of the remaining plies.

9. A pneumatic tire comprising tread and sidewall portions of rubber composition and a carcass composed of a plurality of plies of strain resisting textile elements at least one of the intermediate plies of textile elements in the region adjacent the first ply having a higher rupture resistance than either the first or outer ply.

10. A pneumatic tire comprising tread and sidewall portions of rubber composition and a carcass composed of a plurality of plies of strain resisting elements, the second and third plies each having a higher stretch capacity at break than either the inner or outer ply.

HAROLD S. HOWE.